United States Patent
Chu et al.

(10) Patent No.: US 11,029,563 B2
(45) Date of Patent: Jun. 8, 2021

(54) COLOR CONVERSION SUBSTRATE AND RELATED DISPLAY DEVICE

(71) Applicant: Samsung Display Co., Ltd., Yongin-Si (KR)

(72) Inventors: Seung Jin Chu, Cheonan-si (KR); Yeo Geon Yoon, Suwon-si (KR); Won Tae Kim, Suwon-si (KR); Hoon Kim, Ansan-si (KR); Hee Keun Lee, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/161,006

(22) Filed: Oct. 15, 2018

(65) Prior Publication Data

US 2019/0310522 A1    Oct. 10, 2019

(30) Foreign Application Priority Data

Apr. 9, 2018  (KR) .......................... 10-2018-0041087

(51) Int. Cl.
*G02F 1/13357* (2006.01)
*G02F 1/1335* (2006.01)

(52) U.S. Cl.
CPC .. *G02F 1/133617* (2013.01); *G02F 1/133514* (2013.01); *G02F 1/133528* (2013.01); *G02F 1/133621* (2013.01); *G02F 1/133614* (2021.01); *G02F 2201/121* (2013.01)

(58) Field of Classification Search
CPC ... G02F 1/133617; G02F 2001/133614; G02F 2001/01791; G02F 2201/44; G02F 1/133509; G02F 1/133512; G02F 1/136209; G02F 2001/1351; G02F 1/133514;
(Continued)

(56) References Cited

U.S. PATENT DOCUMENTS 3,972,590 A * 8/1976 Gelber ................. G02F 1/1335
349/106
2004/0135945 A1* 7/2004 Choi ................... G02F 1/13394
349/114
(Continued)

FOREIGN PATENT DOCUMENTS

CN          108153036 A     6/2018
KR   10-2018-0072033 A     6/2018
KR   10-2019-0066109 A     6/2019

*Primary Examiner* — Michael H Caley
*Assistant Examiner* — Mariam Qureshi
(74) *Attorney, Agent, or Firm* — Innovation Counsel LLP

(57) ABSTRACT

A color conversion substrate for displaying a first color, a second color, and a third color may include a base substrate, a first light-blocker, a second light-blocker, a pattern layer, a first color converter, and a second color converter. The first light-blocker contacts a surface of the base substrate and may block first light of the third color. The second light-blocker contacts the surface of the base substrate and may block second light of the third color. The pattern layer is disposed on the first light-blocker and the second light-blocker and includes an optical pattern that includes protrusions. The first color converter overlaps the first light-blocker and may convert a first portion of incident light into light of the first color. The second color converter overlaps the second light-blocker and may convert a second portion of the incident light into light of the second color.

17 Claims, 16 Drawing Sheets

(58) Field of Classification Search
CPC ........... H01L 51/502; H01L 31/035218; H01L 51/5012; H05B 33/00; G02B 5/003
See application file for complete search history.

(56) References Cited

U.S. PATENT DOCUMENTS

| | | | |
|---|---|---|---|
| 2009/0104546 A1* | 4/2009 | Li | G02F 1/133514 430/7 |
| 2017/0076678 A1* | 3/2017 | Lee | G02F 1/133512 |
| 2017/0097542 A1* | 4/2017 | Byun | G02F 1/13394 |
| 2018/0156951 A1 | 6/2018 | Baek et al. | |
| 2018/0284534 A1* | 10/2018 | Song | G02F 1/133617 |
| 2019/0171067 A1 | 6/2019 | Lee et al. | |

* cited by examiner

501: 501a, 501b, 501c

502: 502a, 502b

501: 501a, 501b, 501c

500: 500a, 500b

COLOR CONVERSION SUBSTRATE AND RELATED DISPLAY DEVICE

This application claims priority to Korean Patent Application No. 10-2018-0041087 filed on Apr. 9, 2018, in the Korean Intellectual Property Office; the disclosure of the Korean Patent Application is incorporated herein by reference in its entirety.

BACKGROUND

1. Field of the Disclosure

The technical field relates to a color conversion substrate and relates to a display device including a color conversion substrate.

2. Description of the Related Art

A liquid-crystal display (LCD) device typically includes two substrates, field generating electrodes (such as a pixel electrode and a common electrode) formed on the substrates, and a liquid-crystal layer interposed between the substrates.

An LCD device may display an image when a voltage is applied to field generating electrodes to generate electric field across a liquid-crystal layer, such that liquid-crystal molecules in the liquid-crystal layer are aligned by the electric field to control transmission of incident light.

SUMMARY

Embodiments may be related to a display device that has satisfactory light output efficiency.

Embodiments may be related to a display device with satisfactory light conversion efficiency.

Embodiments may be related to a color conversion substrate that facilitates satisfactory light output efficiency.

Embodiments may be related to a color conversion substrate that has satisfactory light conversion efficiency.

An embodiment is related to a color conversion substrate that has satisfactory light output efficiency and has satisfactory light conversion efficiency.

An embodiment is related to a display device that has satisfactory light output efficiency and has satisfactory light conversion efficiency.

An embodiment of a color conversion substrate includes a base substrate having a first color area, a second color area and a third color area defined thereon; a first light-blocking portion disposed on a surface of the base substrate in the first color area and configured to block light of a third color; a second light-blocking portion disposed on the surface of the base substrate in the second color area and configured to block light of the third color; a first pattern layer disposed on the first light-blocking portion and the second light-blocking portion and comprising a first optical pattern of protrusions from the surface of the base substrate; a first color conversion layer disposed on the first pattern layer to overlap with the first light-blocking portion and configured to convert incident light into light of a first color; and a second color conversion layer disposed on the first pattern layer to overlap with the second light-blocking portion and configured to convert the incident light into light of a second color.

An embodiment of a color conversion substrate includes a base substrate having a first color area, a second color area and a third color area defined thereon; a first color conversion layer disposed on the base substrate in the first color area and configured to convert incident light into light of a first color; a second color conversion layer disposed on the base substrate in the second color area and configured to convert the incident light into light of a second color; a first pattern layer disposed on the first color conversion layer and comprising a first optical pattern of protrusions upward from a surface of the base substrate; and a second pattern layer disposed on the second color conversion layer and comprising a second optical pattern of protrusions upward from the surface of the base substrate.

An embodiment of a display device includes a display substrate comprising a first pixel area, a second pixel area and a third pixel area; and a color conversion substrate disposed above the display substrate, wherein the color conversion substrate comprises: a base substrate; a first light-blocking portion disposed on a surface of the base substrate facing the display substrate to overlap with the first pixel area and configured to block light of a third color; a second light-blocking portion disposed on the surface of the base substrate to overlap with the second pixel area and configured to block light of the third color; a pattern layer disposed on the first light-blocking portion and the second light-blocking portion and comprising a first optical pattern of protrusions from the surface of the base substrate; a first color conversion layer disposed on the pattern layer to overlap with the first light-blocking portion and configured to convert incident light into light of a first color; and a second color conversion layer disposed on the pattern layer to overlap with the second light-blocking portion and configured to convert the incident light into light of a second color.

An embodiment may be related to a color conversion substrate for displaying a first color, a second color, and a third color. The color conversion substrate may include a base substrate, a first light-blocking portion, a second light-blocking portion, a first pattern layer, a first color conversion layer, and a second color conversion layer. The first light-blocking portion may be disposed on a surface of the base substrate and may block first light of the third color. The second light-blocking portion may be disposed on the surface of the base substrate and may block second light of the third color. The first pattern layer may be disposed on the first light-blocking portion and the second light-blocking portion and includes a first optical pattern. The first optical pattern includes first-set protrusions. The first color conversion layer overlaps the first light-blocking portion and may convert a first portion of incident light into light of the first color. The second color conversion layer overlaps the second light-blocking portion and may convert a second portion of the incident light into light of the second color.

The first light-blocking portion, the second light-blocking portion, and the first pattern layer may be made of a same material.

The first light-blocking portion may be a first color filter configured to transmit the light of the first color. The second light-blocking portion may be a second color filter configured to transmit the light of the second color. The first pattern layer may include a first pattern portion and a second pattern portion. The first pattern portion may be made of a same material as the first color filter and overlaps the first color filter. The second pattern portion may be made of a same material as the second color filter and overlaps the second color filter.

The first pattern layer may be made of a light-transmitting organic material.

A width of a first-set protrusion of the first-set protrusions may be greater than 0 μm and may be equal to or less than 5 μm. A height of the first-set protrusion may be greater than 0 µm and may be equal to or less than 1.5 µm. A distance between two immediately adjacent protrusions of the first-set protrusions may be greater than 0 µm and may be equal to or less than 10 µm.

The color conversion substrate may include a light-transmitting layer overlapping the base substrate. The second color conversion layer may be positioned between the first color conversion layer and the light-transmitting layer.

The color conversion substrate may include a color filter disposed between the light-transmitting layer and the surface of the base substrate and configured to transmit third light of the third color. The first pattern layer may overlap the third color filter.

The color conversion substrate may include a color filter disposed between the light-transmitting layer and the surface of the base substrate and configured to transmit third light of the third color. The color conversion substrate may include a second pattern layer disposed on the color filter and including a second optical pattern. The second optical pattern may include second-set protrusions. The second pattern layer may be made of a same material as the color filter.

The color conversion substrate may include a dichroic reflective layer disposed on the first color conversion layer and the second color conversion layer, configured to transmit the first light of the third color and the second light of the third color, and configured to reflect a portion of the light of the first color and a portion of the light of the second color.

The color conversion substrate may include a second pattern layer disposed on the first color conversion layer and including a second optical pattern, wherein the second optical pattern may include second-set protrusions. The color conversion substrate may include a third pattern layer disposed on the second color conversion layer and may include a third optical pattern, wherein the third optical pattern may include third-set protrusions.

The second pattern layer may be made of a same material as the first color conversion layer. The third pattern layer may be made of a same material as the second color conversion layer.

The second pattern layer and the third pattern layer may be made of a light-transmitting organic material.

The first color conversion layer and the second color conversion layer contain quantum dots.

An embodiment may be related to a color conversion substrate for displaying a first color, a second color, and a third color. The color conversion substrate may include the following elements: a base substrate; a first color conversion layer disposed on the base substrate configured to convert a first portion of incident light into light of the first color; a second color conversion layer disposed on the base substrate and configured to convert a second portion of the incident light into light of the second color; a first pattern layer disposed on the first color conversion layer and including a first optical pattern, wherein the first optical pattern may include first-set protrusions; and a second pattern layer disposed on the second color conversion layer and may include a second optical pattern, wherein the second optical pattern may include second-set protrusions.

The first pattern layer may be made of a same material as the first color conversion layer. The second pattern layer may be made of a same material as the second color conversion layer.

Each of the first pattern layer and the second pattern layer may be made of a light-transmitting organic material.

An embodiment may be related to a display device. The display device may include a display substrate. The display device may include a first pixel electrode, a second pixel electrode and a third pixel electrode disposed on the display substrate. The display device may include a color conversion substrate overlapping the display substrate and configured to display a first color, a second color, and a third color. The color conversion substrate may include the following elements: a base substrate; a first light-blocking portion disposed on a surface of the base substrate facing the display substrate, overlapping the first pixel electrode, and configured to block first light of the third color; a second light-blocking portion disposed on the surface of the base substrate, overlapping the second pixel electrode, and configured to block second light of the third color; a pattern layer disposed on the first light-blocking portion and the second light-blocking portion and may include a first optical pattern, wherein the first optical pattern may include first-set protrusions protruding toward the display substrate; a first color conversion layer overlapping the first light-blocking portion and configured to convert a first portion of incident light into light of the first color; and a second color conversion layer overlapping the second light-blocking portion and configured to convert a second portion of the incident light into light of the second color.

The color conversion substrate further may include a light-transmitting layer overlapping the third pixel electrode. The second color conversion layer may be positioned between the first color conversion layer and the light-transmitting layer. The color conversion substrate further may include a third color filter disposed between the surface of the base substrate and the light-transmitting layer and configured to transmit third light of the third color.

The display device may include the following elements: a liquid-crystal layer disposed between the display substrate and the color conversion substrate; and a backlight unit configured to emit the first light of the third color, the second light of the third color, and the third light of the third color. The display substrate may be positioned between the liquid-crystal layer and the backlight unit.

The display device may include the following elements: a common electrode disposed between the color conversion substrate and the liquid-crystal layer; and a polarizing layer disposed between the common electrode and the color conversion substrate.

DETAILED DESCRIPTION

Example embodiments are described with reference to the accompanying drawings. Embodiments may be embodied in different forms and should not be construed as limited to the example embodiments.

The same reference numbers may indicate the same or similar components. In the attached figures, thicknesses of layers and regions may be exaggerated for clarity.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element.

Although the terms "first," "second," etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

Figure 1:
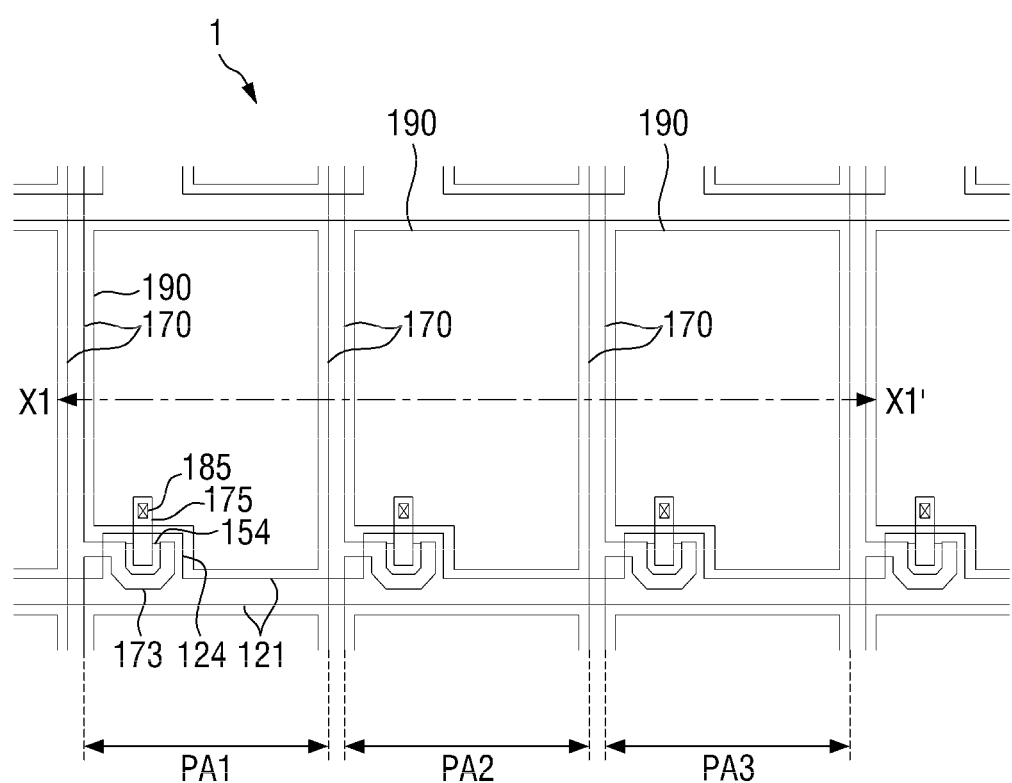
FIG. 1 is a plan view of a display device according to an embodiment.
Figure 2:
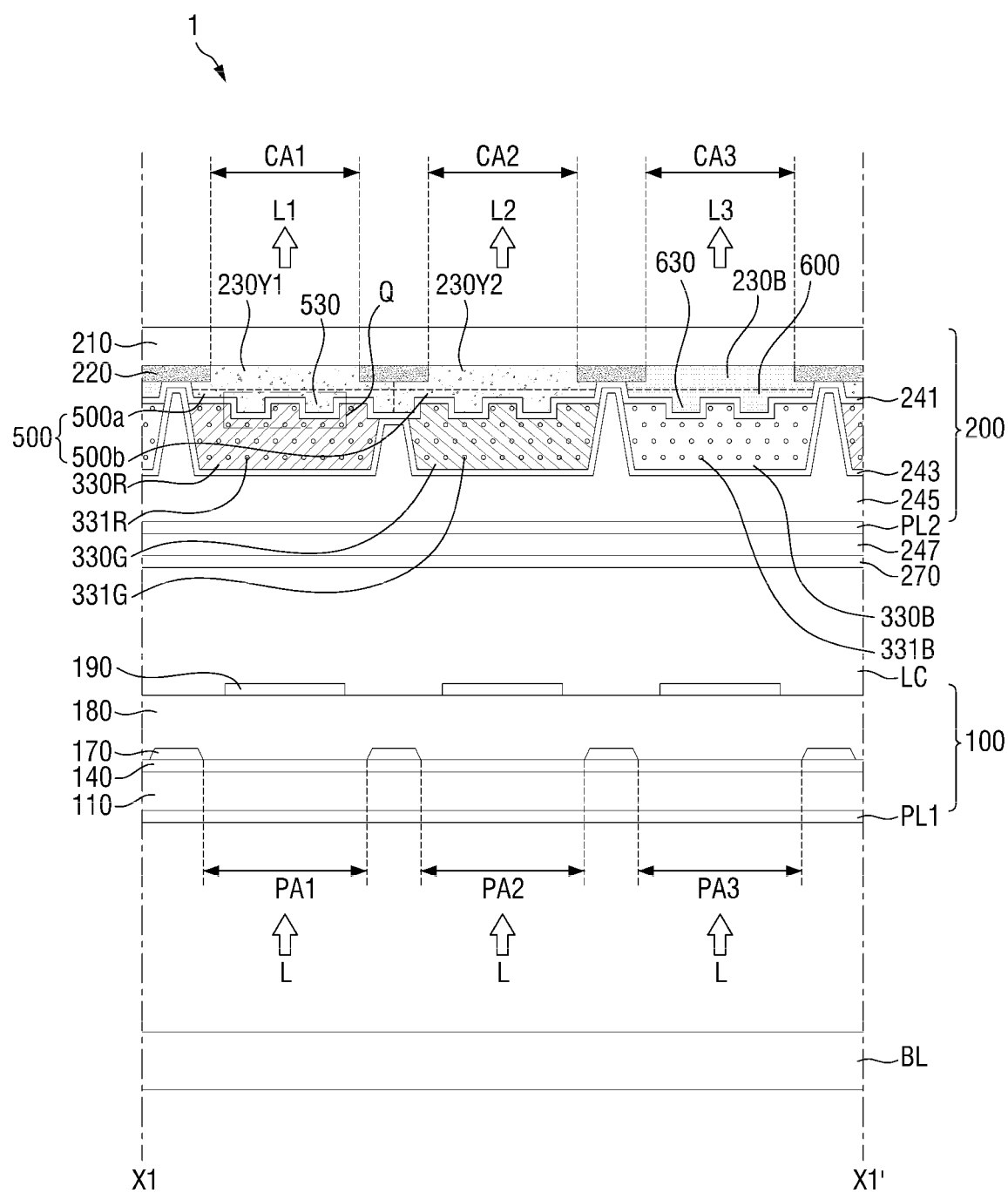
FIG. 2 is a cross-sectional view of a display device, taken along line X1-X1' of FIG. 1, according to an embodiment.
Figure 3:
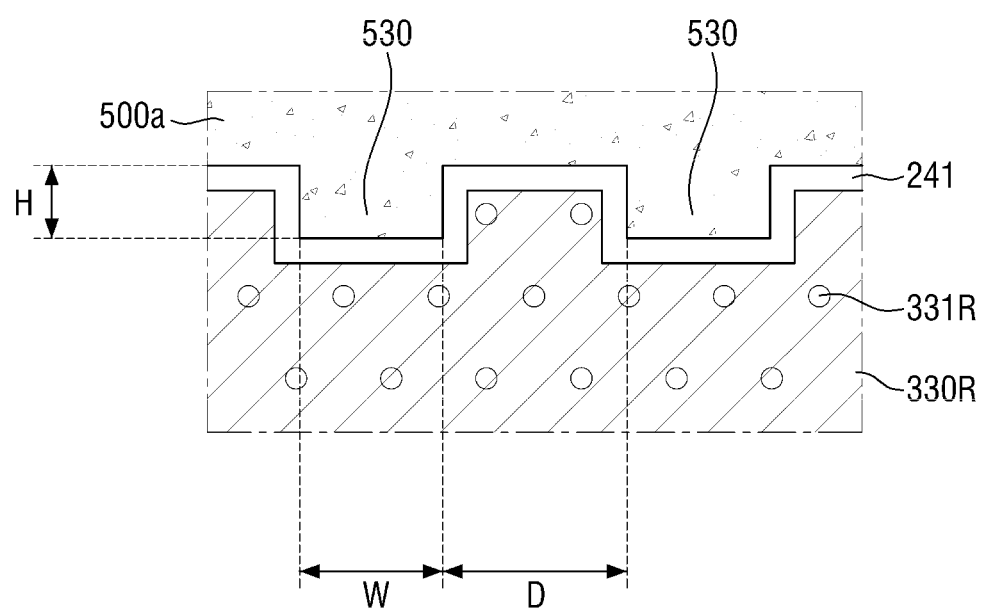
FIG. 3 is an enlarged view of portion Q of FIG. 2 according to an embodiment.
Figure 4:
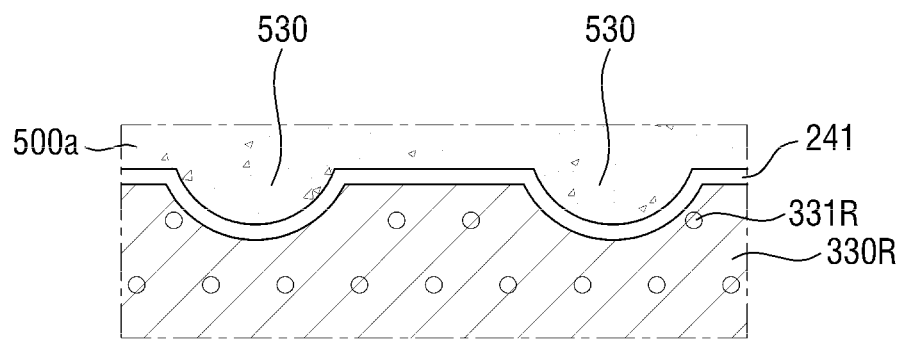
FIG. 4 and FIG. 5 are views showing modifications of the structure shown in FIG. 3 according to one or more embodiment.
Figure 5:
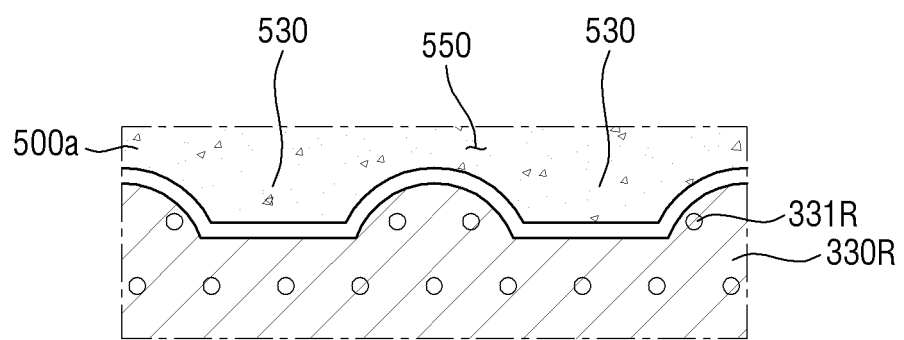

FIG. 1 is a plan view of a display device according to an embodiment. FIG. 2 is a cross-sectional view of the display device, taken along line X1-X1' of FIG. 1, according to an embodiment. FIG. 3 is an enlarged view of portion Q of FIG. 2 according to an embodiment. FIGS. 4 and 5 are views showing modifications of the structure shown in FIG. 3 according to one or more embodiments.

Referring to FIGS. 1 to 5, a display device 1 according to an embodiment includes a display substrate 100, a color conversion substrate 200, a liquid-crystal layer LC interposed between the display substrate 100 and the color conversion substrate 200, and a backlight unit BL disposed below the display substrate 100. The display device 1 may further include a lower polarizing layer PL1, an upper polarizing layer PL2, and a common electrode 270.

The backlight unit BL provides light L toward the display substrate 100 and the color conversion substrate 200. The backlight unit BL may include a light source for generating light. The backlight unit BL may include a light guide plate for receiving light generated from the light source and guiding the light toward the display substrate 100 and the color conversion substrate 200.

The backlight unit BL may include at least one light-emitting diode as the light source. For example, the light-emitting diode may be a blue light-emitting diode. That is, light L provided by the backlight unit BL toward the display substrate 100 may be blue light. The backlight unit BL may include a white light source or an ultraviolet light source instead of the blue light-emitting diode as the light source. In the following description, light L provided by the backlight unit BL toward the display substrate 100 is blue light as an example.

The display substrate 100 may include and/or support switching elements, e.g., thin-film transistors, for controlling liquid-crystal molecules in the liquid-crystal layer LC.

The display substrate 100 may include one or more of the following elements.

The first base substrate 110 may be a transparent insulation substrate. The first base substrate 110 may be made of an insulating material such as glass, quartz and a polymer resin, and may transmit light. Examples of the polymer resin may include polyethersulphone (PES), polyacrylate (PA), polyacrylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP) or a combination of some of the materials.

The first base substrate 110 may be a rigid substrate or a flexible substrate that can be bent, folded, rolled, and so on. An example of the material of the flexible substrate is polyimide (PI).

A plurality of pixel areas may be defined in the first base substrate 110. For example, a first pixel area PA1, a second pixel area PA2 and a third pixel area PA3 may be defined in the first base substrate 110. In each pixel area, configurations/elements for forming a single pixel are disposed. The first pixel area PA1, the second pixel area PA2 and the third pixel area PA3 may be sequentially arranged along the row direction.

On the first base substrate 110, gate lines 121 extend in the row direction and are spaced apart from one another in the column direction, and a gate electrode 124 is connected to a gate line 121 and disposed in each of the first pixel area PA1, the second pixel area PA2 and the third pixel area PA3. A gate insulating layer 140 is disposed on the gate lines 121 and the gate electrode 124. A semiconductor layer 154 may be disposed on the gate insulating layer 140 in each of the first pixel area PA1, a second pixel area PA2, and a third pixel area PA3.

On the gate insulating layer 140, data lines 170 extend in the column direction and are spaced apart from one another in the row direction, a source electrode 173 is connected to the data lines 170, and a drain electrode 175 is associated with the source electrode 173. A source electrode 173 and a drain electrode 175 may be disposed in each of the first pixel area PA1, the second pixel area PA2, and the third pixel area PA3.

The data lines 170 and the gate lines 121 may define the first pixel area PA1, the second pixel area PA2, and the third pixel area PA3.

An interlayer dielectric layer 180 may be disposed over the data lines 170, the source electrode 173 and the drain electrode 175. A pixel electrode 190 may be disposed on the interlayer dielectric layer 180. A pixel electrode 190 may be disposed in each of the first pixel area PA1, the second pixel area PA2, and the third pixel area PA3.

The corresponding pixel electrode 190 may be electrically connected to the corresponding drain electrode 175 in each of the pixel areas through a contact hole 185 formed in the interlayer dielectric layer 180. Each pixel electrode 190 may be made of a transparent conductive material such as ITO and IZO.

In each of the pixel areas, the gate electrode 124, the semiconductor layer 154, the source electrode 173, and the drain electrode 175 can form a single thin-film transistor.

In some embodiments, the lower polarizing layer PL1 may be disposed on the lower surface of the display substrate 100. In embodiments, the lower polarizing layer PL1 may be disposed in the display substrate 100 or on the surface of the display substrate 100 facing the color conversion substrate 200.

The color conversion substrate 200 may include one or more of the following elements.

A second base substrate 210 may be a transparent insulating substrate, similarly to the first base substrate 110. In some embodiments, the second base substrate 210 may include the same material as the first base substrate 1110 or may include at least one material selected from the above-listed materials of the first base substrate 110.

The second base substrate 210 may include a first color area CAL a second color area CA2, and a third color area CA3. The first color area CA1 may be a region where light of a first color L1 exits the upper side of the second base substrate 210. Similarly, the second color area CA2 may be a region where light of a second color L2 exits the upper side of the second base substrate 210. The third color area CA3 may be a region where light of a third color L3 exits the upper side of the second base substrate 210. In some embodiments, the first color may be red, the second color may be green, and the third color may be blue. In the following description, it is assumed that the first color is red, the second color is green, and the third color is blue for convenience of illustration. The first color area CA1 may overlap the first pixel area PA1, the second color area CA2 may overlap the second pixel area PA2, and the third color area CA3 may overlap the third pixel area PA3.

A shielding element 220 may be disposed on the surface of the second base substrate 210 facing the display substrate 100. The shielding element 220 may define a first color area CA1, a second color area CA2, and a third color area CA3 on the second base substrate 210. In some embodiments, the shielding element 220 may overlap the data lines 170 of the display substrate 100 and may overlap the gate lines 121 and the thin-film transistor as well.

In the first color area CA1, a first light-blocking portion 230Y1 may be disposed on the surface of the second base substrate 210.

In some embodiments, the first light-blocking portion 230Y1 may be a filter that cuts off and/or filters out light of the third color. For example, the first light-blocking portion 230Y1 may be a blue light cut-off filter. The first light-blocking portion 230Y1 can prevent color mixing when light L emitted from the backlight unit BL passes through a first color conversion layer 330R, to produce/display the first color, e.g., red.

In some embodiments, the first light-blocking portion 230Y1 may be a yellow color filter. For example, the first light-blocking portion 230Y1 is made of a photosensitive organic material and may include a yellow colorant.

In the second color area CA2, a second light-blocking portion 230Y2 may be disposed on the surface of the second base substrate 210. The second light-blocking portion 230Y1 may be a filter that cuts off light of the third color, i.e., a blue cut-off filter.

In some embodiments, the second light-blocking portion 230Y2 may be made of the same material as the first light-blocking portion 230Y1 and may be formed together with the first light-blocking portion 230Y1. As shown in FIG. 2, the second light-blocking portion 230Y2 may be integrally formed with the first light-blocking portion 230Y1 to cover a part of the shielding element 220. In implementations, the second light-blocking portion 230Y2 may be separated from the first light-blocking portion 230Y1.

The first light-blocking portion 230Y1 and the second light-blocking portion 230Y2 may not be disposed in the third color area CA3.

A first pattern layer 500 may be disposed on the first light-blocking portion 230Y1 and the second light-blocking portion 230Y2. The first pattern layer 500 may include a first optical pattern with protrusions 530 protruding toward the display substrate 100.

Some of the light incident on the second base substrate 210 may not exit through the opposite surface of the second base substrate 210 and may be totally reflected within the second base substrate 210. Without structures according to one or more embodiments, the light output efficiency may lower, and the color gamut may deteriorate. For example, some of the incident light that has passed through the first light-blocking portion 230Y1 to be incident on the second base substrate 210 and travels at an angle greater than a critical angle may be totally reflected within the second base substrate 210, to be incident on the adjacent second color area CA2. As a result, the color gamut in the second color area CA2 may deteriorate.

According to an embodiment, as the first pattern layer 500 includes the first optical pattern of protrusions 530, the path of the light that has been converted in the first color conversion layer 330R or the second color conversion layer 330G and incident on the first pattern layer 500 is changed by the first optical pattern/protrusions 530, to improve the linearity. The light that has passed through the first light-blocking portion 230Y1 or the second light-blocking portion 230Y2 and is incident on the second base substrate 210 may have an incidence angle smaller than the critical angle, and may exit without total reflection. The first optical pattern/ protrusions 530 of the first pattern layer 500 can change the incidence angle of light incident on the second base substrate 210 so that it is smaller than the critical angle. Advantageously, satisfactory output efficiency and color gamut of the display device 1 may be attained.

In some embodiments, the height H of a/each first optical pattern protrusion 530 may be greater than 0 μm and may be less than or equal to 1.5 μm (to increase the light output efficiency), and the width W of the/each first optical pattern protrusion 530 may be greater than 0 μm and may be equal to or less than 5 μm. The distance D between immediately adjacent protrusions 530 of the first optical pattern may be greater than 0 μm and may be equal to or less than 10 μm.

The height H, the width W, and the distance D of the first optical pattern protrusions 530 may be adjusted within allowable margins to increase the light output efficiency.

In some embodiments, the cross-section of a/each first optical pattern protrusion 530 may be a rectangular shape as shown in FIG. 3. In embodiments, the first optical pattern 530 may have a convex lens shape as shown in FIG. 4. In embodiments, the shape of a/each first optical pattern protrusion 530 may be modified so that the cross section of portions 550 of the first pattern layer 500 has a concave lens shape/structure, as shown in FIG. 5. The cross section of a/each first optical pattern protrusion 530 may be configured to have one or more of a variety of shapes, e.g., a prism shape or a polygonal shape, according to particular embodiments.

The first pattern layer 500 may include a first portion 500a overlapping the light-blocking portion 230Y1, and a second portion 500b overlapping the second light-blocking portion 230Y2. In some embodiments, the first portion 500a may be (directly) connected to the second portion 500b and may partially overlap the light-blocking member 220.

In some embodiments, the first pattern layer 500 and the first optical pattern protrusions 530 may be made of the same materials as the first light-blocking portion 230Y1 and the second light-blocking portion 230Y2. In embodiments, the first portion 500a of the first pattern layer 500 and the first light-blocking portion 230Y1 may be formed integrally and/or connected directly, and the second portion 500b of the first pattern layer 500 and the second light-blocking portion 230Y2 may be formed integrally and/or connected directly.

In the third color area CA3, a third color filter 230B may be disposed on the surface of the second base substrate 210. The third color filter 230B may be a filter that transmits light of the third color and blocks light of the first color and light of the second color, for example, a blue color filter.

A second pattern layer 600 including a second optical pattern with protrusions 630 may be disposed on the third color filter 230B. The second optical pattern protrusions 630 can change the incidence angle of light incident on the second base substrate 210 so that it is equal to or less than the critical angle, like the first optical pattern protrusions 530.

The shape, width, and height of a/each protrusion 630 and/or the distance between immediately adjacent second optical protrusions 630 may be substantially identical to or analogous to those associated with one or more first optical pattern protrusions 530.

In some embodiments, the second pattern layer 600 and the second optical pattern 630 may be made of the same material as the third color filter 230B and may be formed integrally with the third color filter 230B.

A passivation layer 241 covering the first pattern layer 500 and the second pattern layer 600 may be disposed on the second base substrate 210. The passivation layer 241 may prevent moisture and/or oxygen from permeating into the first color conversion layer 330R and the second color conversion layer 330G. In some embodiments, the passivation layer 241 may contain an inorganic material. For example, the passivation layer 241 may include silicon nitride, aluminum nitride, zirconium nitride, titanium nitride, hafnium nitride, tantalum nitride, silicon oxide, aluminum oxide, titanium oxide, tin oxide, cerium oxide and silicon oxynitride, or a metal thin film with light transmittance. In an embodiment, the passivation layer 241 may be made of silicon oxide and may have a thickness of approximately 400 nm.

The first color conversion layer 330R may be disposed on the passivation layer 241 in the first color area CA1, and the second color conversion layer 330G may be disposed on the passivation layer 241 in the second color area CA2.

In some embodiments, the first color conversion layer 330R may contain wavelength-converting particles 331R that convert light L, e.g., blue light provided from the backlight unit BL into light of a first color, e.g., red. In embodiments, the second color conversion layer 330G may contain wavelength-converting particles 331G that convert blue light into light of a second color, e.g., green light.

The wavelength-converting particles are for converting the wavelength of incident light, and may be, for example, quantum dots (QD), a fluorescent material, or a phosphorescent material. In some embodiments, the wavelength-converting particles may be quantum dots. A quantum dot is a material with a crystal structure of several nanometers in size, and consists of hundreds to thousands of atoms. It exhibits the quantum confinement effect which leads to an increase in the energy band gap due to such a small size. When a light of a wavelength having an energy level higher than the bandgap is incident on a quantum dot, the quantum dot is excited by absorbing the light and relaxed to the ground state while emitting light of a particular wavelength. The emitted light of the wavelength has a value corresponding to the band gap. By adjusting the size and composition of the quantum dots, the luminescence characteristics due to the quantum confinement effect can be adjusted.

A quantum dot may include, for example, at least one of a group II-VI compound, a group II-V compound, a group III-VI compound, a group III-V compound, a group IV-VI compound, a group compound, a group II-IV-VI compound, and a group II-IV-V compound.

A quantum dot may include a core and a shell overcoating the core. The core may be/include at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si and Ge. The shell may include, but not limited to, at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe and PbTe.

The quantum dots may have a full width at half maximum (FWHM) of the emission wavelength spectrum of approximately 45 nm or less, preferably approximately 40 nm or less, more preferably approximately 30 nm or less. Within the above ranges, the color purity and color gamut can be improved. In embodiments, the light emitted through the quantum dots exits in all directions, so that a wide viewing angle can be improved.

The quantum dots may have a spherical shape, a pyramidal shape, and/or a multi-arm shape, or may be cubic nanoparticles, nanotubes, nanowires, nanofibers, nanoplatelets or the like.

Smaller quantum dots emit light having a shorter wavelength. Accordingly, the quantum dots included in the first color conversion layer 330R and the quantum dots included in the second color conversion layer 330G have different sizes.

A light-transmitting layer 330B may be disposed on the passivation layer 241 in the third color area CA3. The light-transmitting layer 330B may include a resin that transmits light L provided from the backlight unit BL, e.g., blue light. In some embodiments, the light-transmitting layer 330B may contain a colorless transparent resin.

In some embodiments, the light-transmitting layer 330B may further contain scattering particles 331B dispersed in the resin. The scattering particles 331B may be formed of particles such as $TiO_2$.

A dichroic reflective layer 243 may be disposed on the first color conversion layer 330R, the second color conversion layer 330G, and the light-transmitting layer 330B.

The dichroic reflective layer 243 may include a dichroic filter. The dichroic reflective filter transmits some of incident light having a particular wavelength while reflecting light having other wavelengths. In some embodiments, the dichroic reflective layer 243 may transmit light of a third color, e.g., blue light, and may reflect light of a first color, e.g., red light, and light of a second color, e.g., green light.

When light L provided from the backlight unit BL is blue light, the dichroic reflective layer 243 may be used to transmit blue light and reflect light other than blue light. The light incident from the backlight unit BL passes through the dichroic reflective layer 243. The red light converted by the first color conversion layer 330R and the green light converted by the second color conversion layer 330B are reflected by the dichroic reflective layer 243. The dichroic reflective layer 243 may also be referred to as a yellow reflective filter (YRF).

Specifically, since the red light and the green light are reflected by the dichroic reflective layer 243, if the red light generated in the first color conversion layer 330R or the green light generated in the second color conversion layer 330G exits toward the display substrate 100, it is reflected by the dichroic reflective layer 243 toward the second base substrate 210, exiting to the outside. As a result, the light efficiency of the display device 1 can be improved.

In some embodiments, the dichroic reflective layer 243 may include a plurality of high refractive layers and a plurality of low refractive layers stacked on one another alternately. Selective light transmission can be performed in the dichroic reflective layer 243 by the multilayer interference phenomenon by the plurality of high refractive layers and the plurality of low refractive layers. The low refractive layers may include $MgF_2$ and/or $SiO_2$, and the high refractive layers may include at least one of Ag, $TiO_2$, $Ti_2O_3$ and $Ta_2O_3$. The thickness of each of the layers may be in the range of ⅛ to ½ of the wavelength of the transmitted light. The wavelengths of the transmitted light and the reflected light can be adjusted according to the configuration of each layer included in the dichroic reflective layer 243.

A planarization layer 245 may be disposed over the dichroic reflective layer 243. As its name suggests, the planarization layer 245 can provide a flat surface over the surface of the color conversion substrate 200 facing the display substrate 100. In some embodiments, the planarization layer 245 may contain an organic insulating material, and in some embodiments the organic insulating material may be a photosensitive organic insulating material.

In some embodiments, the upper polarizing layer PL2 may be disposed on the planarization layer 245 of the color conversion substrate 200. In some embodiments, the upper polarizing layer PL2 may be a wire grid polarizer.

An insulating layer 247 may be disposed on the upper polarizing layer PL2. A common electrode 270 may be disposed on the insulating layer 247. The common electrode 270 receiving a common voltage may form an electric field together with the pixel electrode 190 to align and/or orient the liquid-crystal molecules located in the liquid-crystal layer LC between the common electrode 270 and the pixel electrode 190.

The liquid-crystal layer LC includes the liquid-crystal molecules. The orientation of the liquid-crystal molecules is aligned by the electric field between the pixel electrode 190 and the common electrode 270. By controlling the transmittance of the light provided from the backlight unit BL according to the orientation of the liquid-crystal molecules, images can be displayed.

Figure 6:
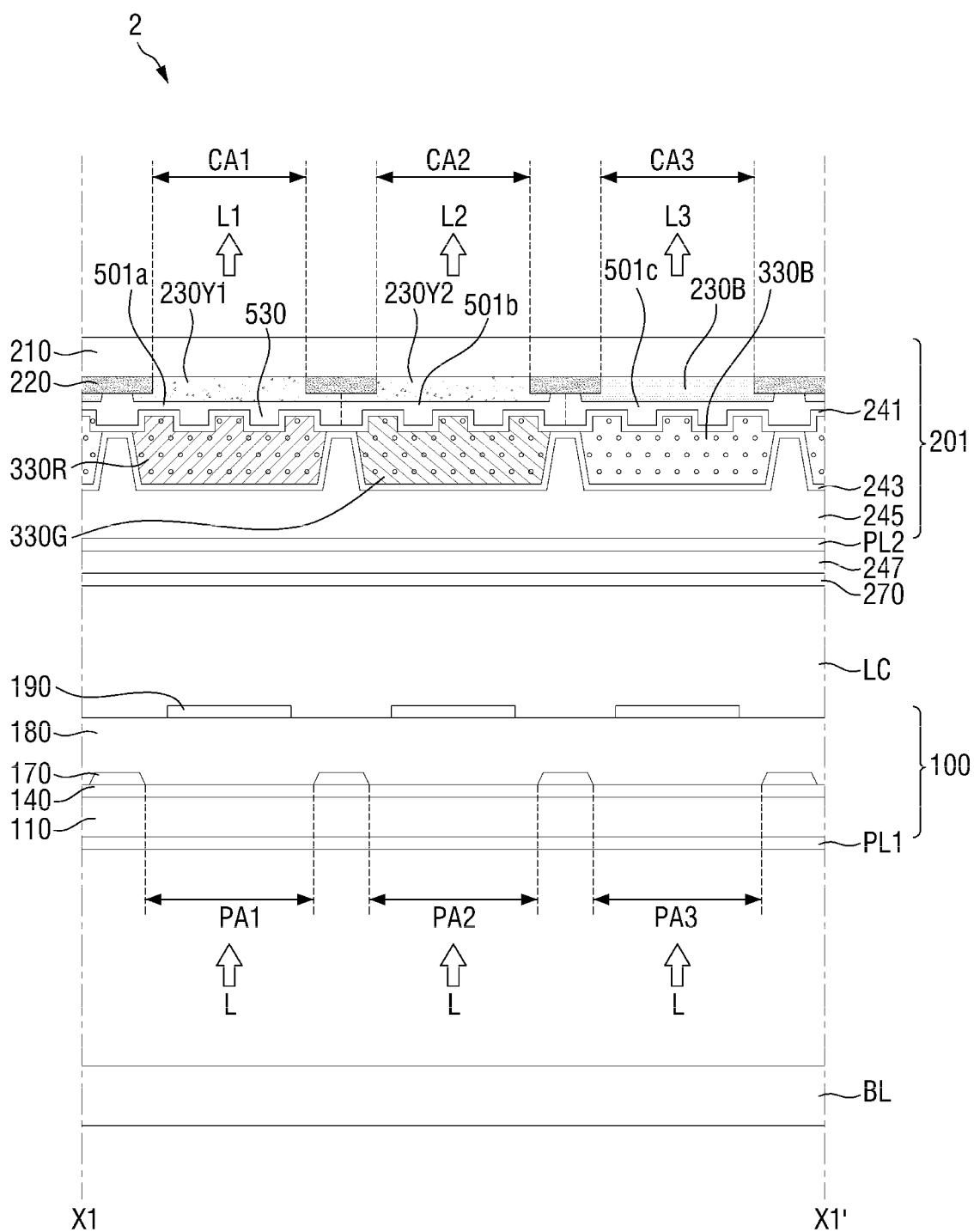
FIG. 6 is a cross-sectional view of a display device according to an embodiment.

FIG. 6 is a cross-sectional view of a display device according to an embodiment.

Referring to FIG. 6, a display device 2 is substantially identical to the display device 1 described above with reference to FIGS. 1 to 5 except that a color conversion substrate 201 is different from the color conversion substrate 200 of the display device 1.

The second pattern layer 600 described above with reference to FIGS. 1 to 5 may not be disposed on the third color filter 230B of the color conversion substrate 201. The first pattern layer 501 may further include a third portion 501c overlapping the third color filter 230B, as well as the first portion 501a overlapping with the first light-blocking portion 230Y1, and the second portion 501b overlapping with the second light-blocking portion 230Y2.

The first pattern layer 501 may be made of a material different from that of the first light-blocking portion 230Y1 and/or the second light-blocking portion 230Y2. In some embodiments, the first pattern layer 501 may be made of an organic insulating material having light transmittance.

Other elements of the display device 2 are substantially identical to or analogous to those of the display device 1 described above with reference to FIGS. 1 to 5.

Figure 7:
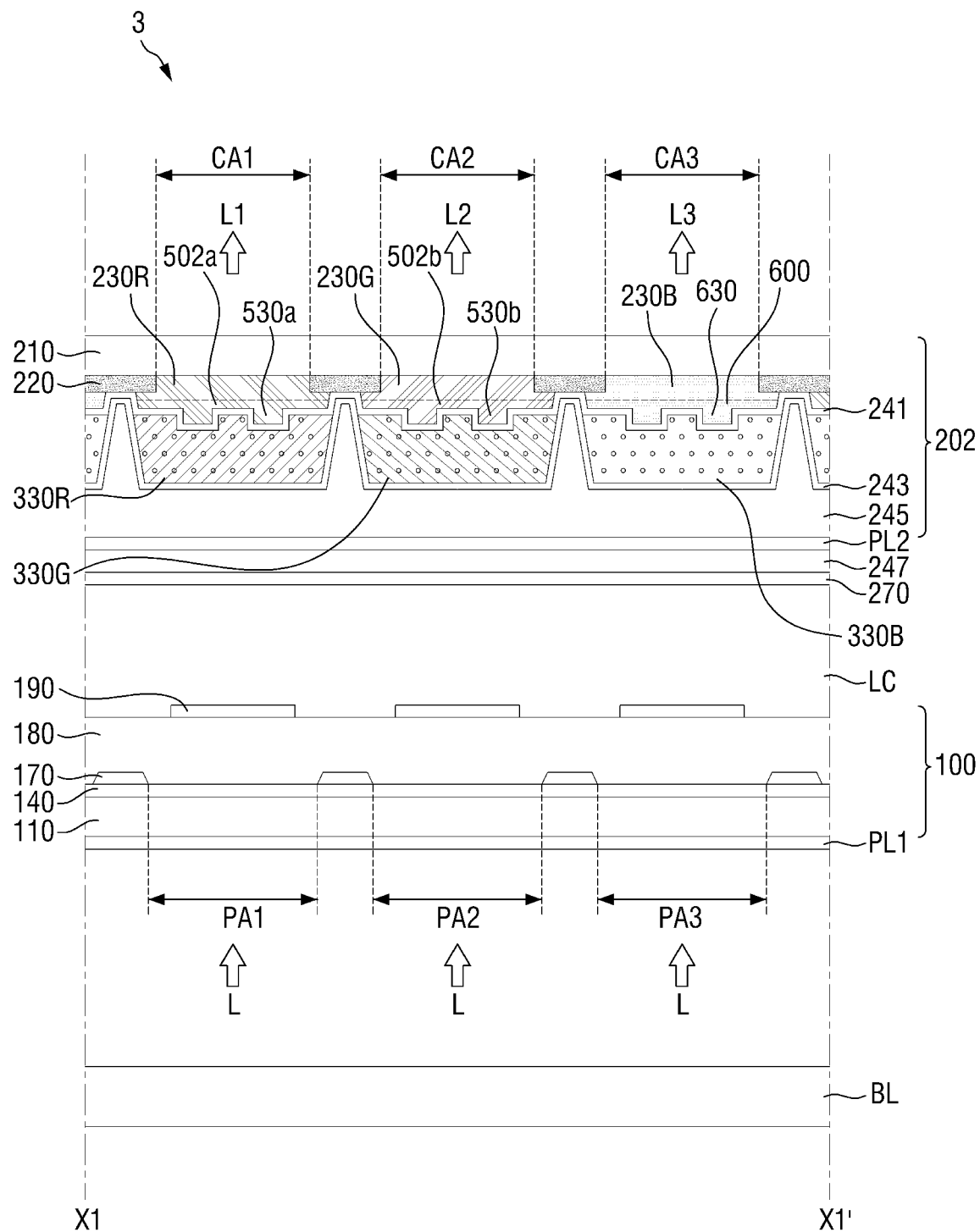
FIG. 7 is a cross-sectional view of a display device according to an embodiment.

FIG. 7 is a cross-sectional view of a display device according to an embodiment.

Referring to FIG. 7, a display device 3 is substantially identical to the display device 1 described above with reference to FIGS. 1 to 5 except that a color conversion substrate 202 is different from the color conversion substrate 200 of the display device 1.

The first light-blocking portion 230R of the color conversion substrate 202 may be a red color filter, and the second light-blocking portion 230G may be a green color filter. In some embodiments, the first light-blocking portion 230R may be spaced apart from the second light-blocking portion 230G with a light-blocking member 220 positioned between the portions 230R and 230G.

A first pattern layer 502 may include a first portion 502a overlapping the first light-blocking portion 230R, and a second portion 502b overlapping second light-blocking portion 230G. In some embodiments, the first portion 502a may be spaced apart from the second portion 502b.

The first portion 502a and the first optical pattern 530a included in the first portion 502a may be made of the same material as the first light-blocking portion 230R and may be integrally formed with the first light-blocking portion 230R.

The second portion 502b and the second optical pattern 530b included in the second portion 502b may be made of the same material as the second light-blocking portion 230G and may be integrally formed with the second light-blocking portion 230G.

Other elements of the display device 3 are substantially identical to or analogous to those of the display device 1 described above with reference to FIGS. 1 to 5.

Figure 8:
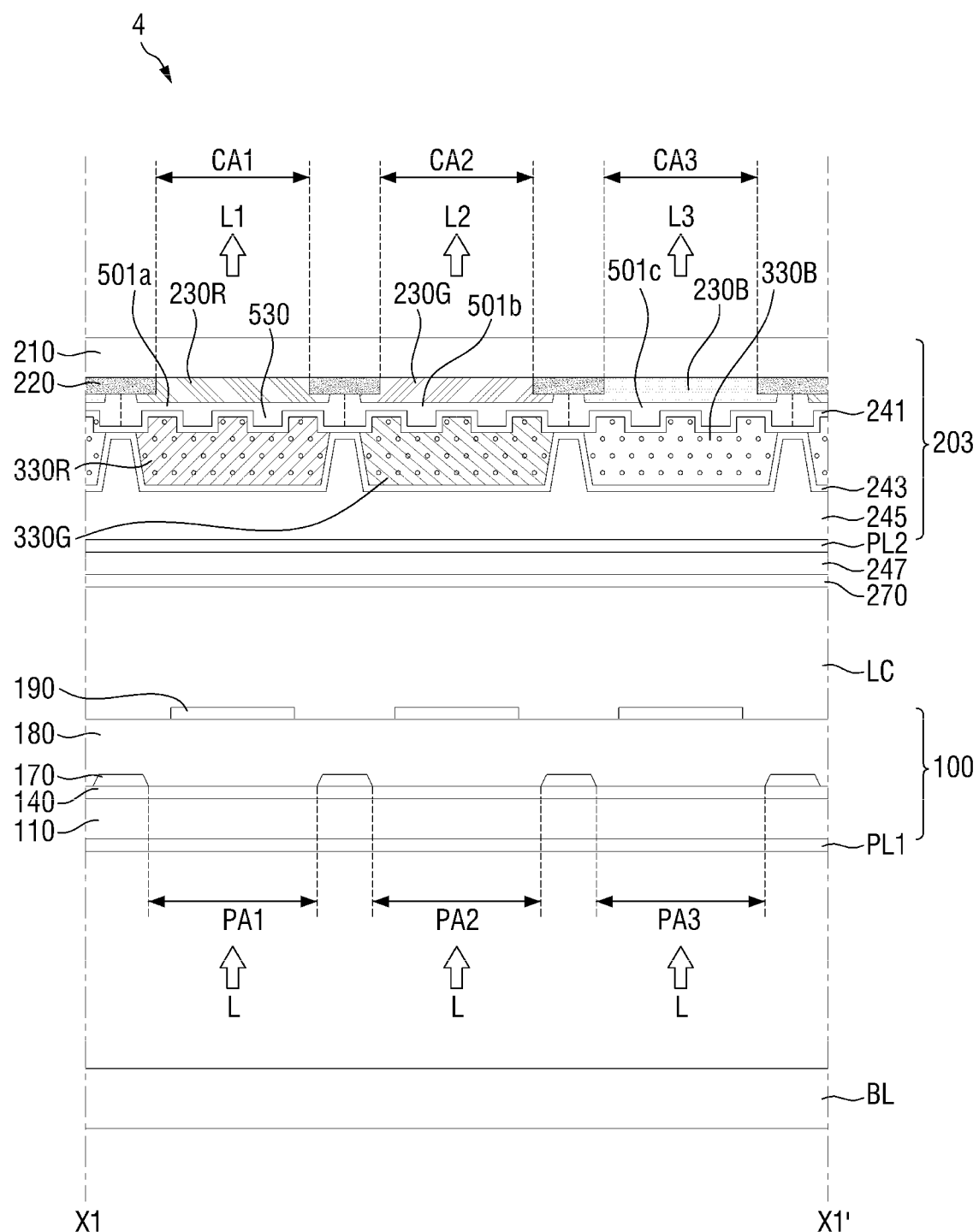
FIG. 8 is a cross-sectional view of a display device according to an embodiment.

FIG. 8 is a cross-sectional view of a display device according to an embodiment.

Referring to FIG. 8, a display device 4 is substantially identical to the display device 3 described above with reference to FIG. 7 except for the configuration of a color conversion substrate 203.

The second pattern layer 600 described above with reference to FIG. 7 may not be disposed on the third color filter 230B of the color conversion substrate 203.

The first pattern layer 501 may include a third portion 501c overlapping the third color filter 230B, as well as the first portion 501a overlapping the first light-blocking portion 230R, and the second portion 501b overlapping with the second light-blocking portion 230G. The first pattern layer 501 is identical to or analogous to that described above with reference to FIG. 6.

Other elements of the display device 4 are substantially identical to or analogous to those of the display device 1 described above with reference to FIGS. 1 to 5.

In a display device according to one or more embodiments, one or more optical patterns are disposed between a base substrate and one or more color conversion layers, so that satisfactory light output efficiency and/or satisfactory color gamut may be attained.

Figure 9:
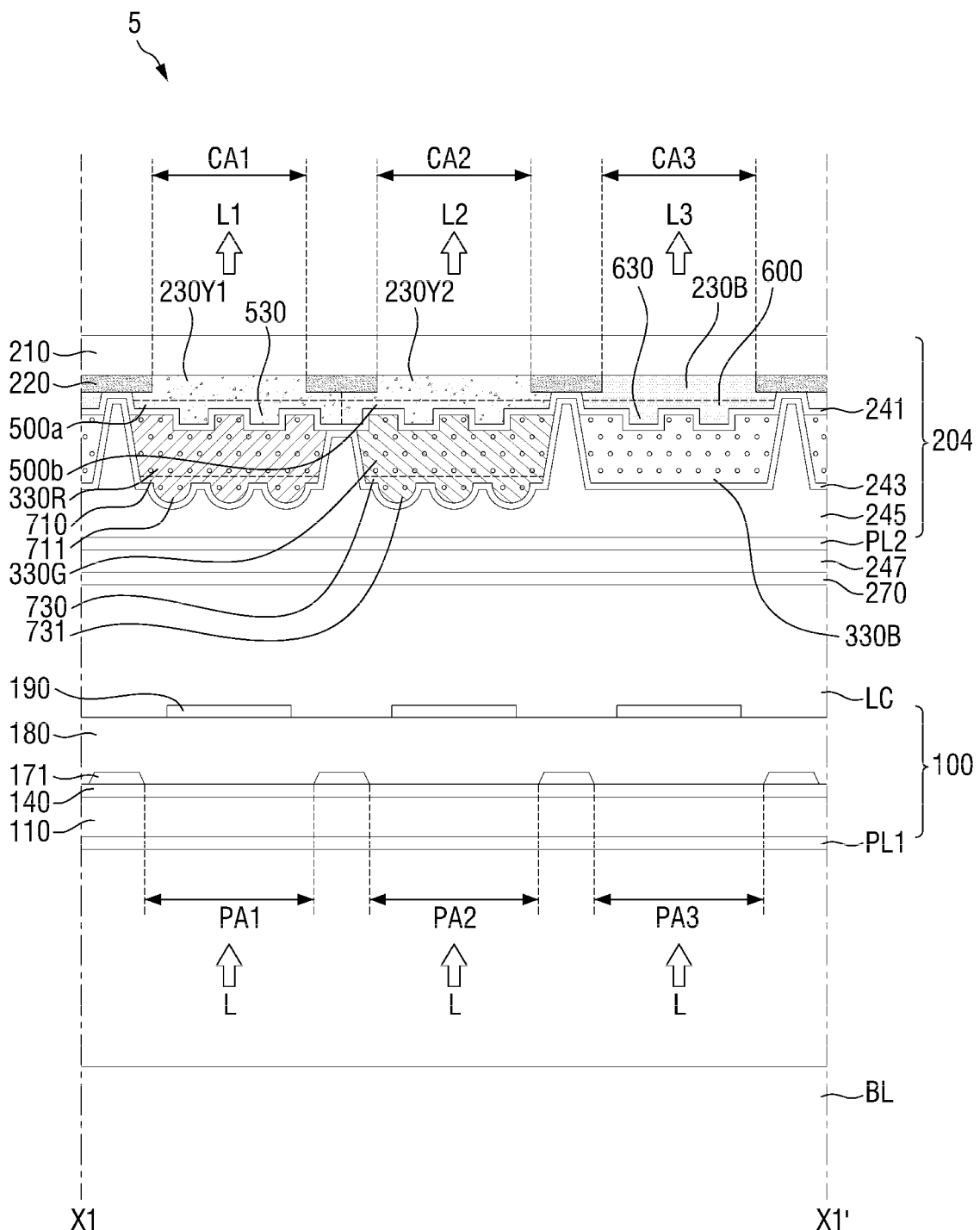
FIG. 9 is a cross-sectional view of a display device according to an embodiment.

FIG. 9 is a cross-sectional view of a display device according to an embodiment.

Referring to FIG. 9, the display device 5 is substantially identical to the display device 1 described above with reference to FIGS. 1 to 5 except that a color conversion substrate 204 of the display device 5 further includes a third pattern layer 710 and a fourth pattern layer 730.

The third pattern layer 710 including a third optical pattern 711 may be disposed on the first color conversion layer 330R. The third optical pattern 711 may condense light L provided by the backlight unit BL and transmitted into the first color conversion layer 330R. The third optical pattern 711 may work as a light-condensing pattern. Accordingly, the amount of light provided to the first color conversion layer 330R can be increased, and consequently, the light conversion efficiency of the first color conversion layer 330R can be improved.

In some embodiments, the third pattern layer 710 including the third optical pattern 711 may be made of the same material as and may be formed integrally with the first color conversion layer 330R.

The fourth pattern layer 730 including a fourth optical pattern 731 may be disposed on the second color conversion layer 330G. Like the third optical pattern 711, the fourth optical pattern 731 may work as a light-condensing pattern.

In some embodiments, the fourth pattern layer 730 including the fourth optical pattern 731 may be made of the same material as and may be formed integrally with the second color conversion layer 330G.

The third optical pattern 711 and the fourth optical pattern 731 may each have convex lens structures shown in the drawings. The structures of the third optical pattern 711 and the fourth optical pattern 731 may be configured to have one or more other shapes, such as a polygonal shape or a prism shape.

Figure 10:
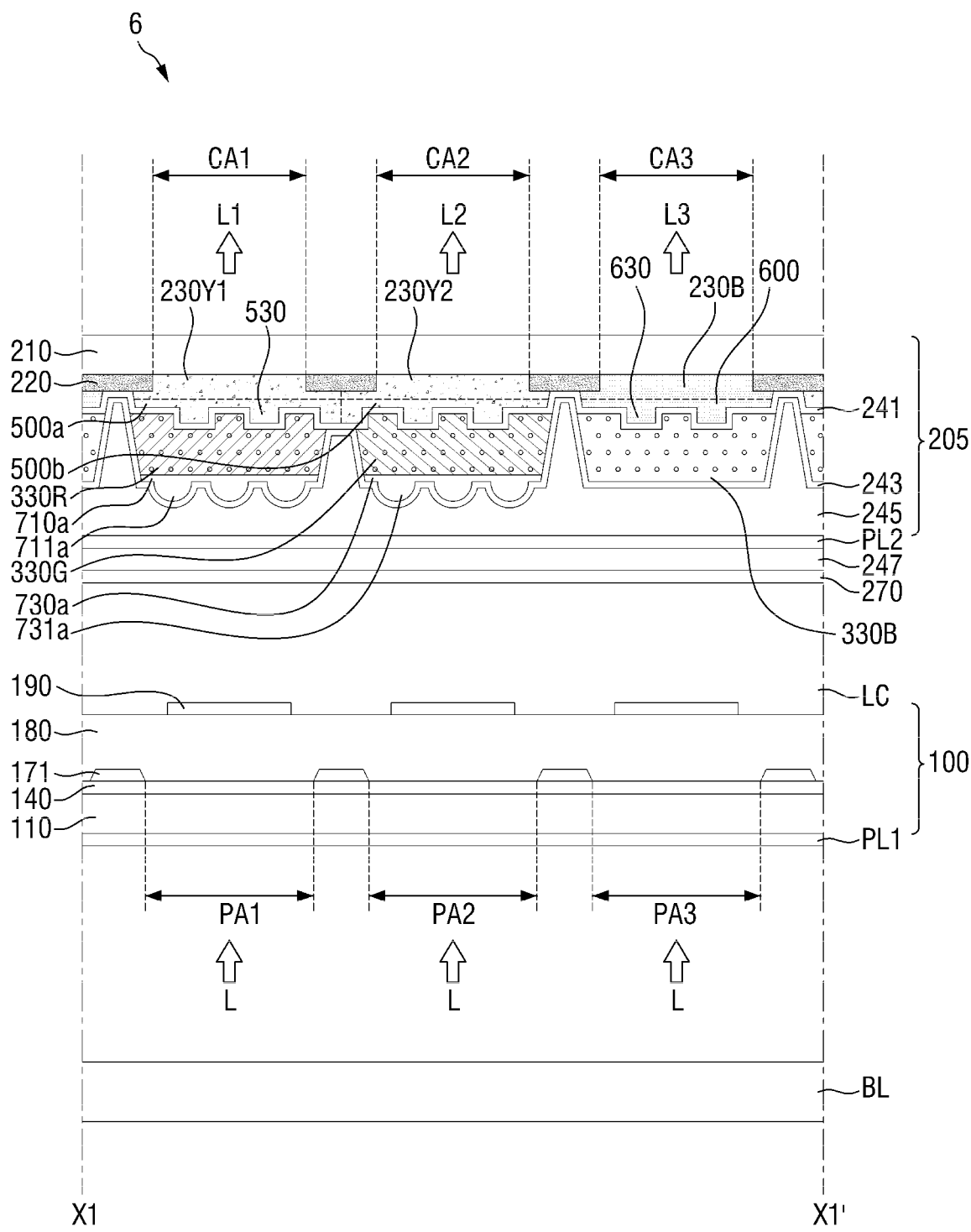
FIG. 10 is a cross-sectional view of a display device according to an embodiment.

FIG. 10 is a cross-sectional view of a display device according to an embodiment.

Referring to FIG. 10, a display device 6 is substantially identical to the display device 5 described above with reference to FIG. 9 except that a color conversion substrate 205 includes a third pattern layer 710a and a fourth pattern layer 730a, that the third pattern layer 710a is made of a material different from that of the first color conversion layer 330R, and that the fourth pattern layer 730a is made of a material different from that of the second color conversion layer 330G.

The third pattern layer 710a including the third optical pattern 711a may be made of a light-transmitting, organic insulating material.

Similarly, the fourth pattern layer 730a including the fourth optical pattern 731a may be made of a light-transmitting, organic insulating material. In some embodiments, the third pattern layer 710a and the fourth pattern layer 730a may be made of the same material.

Figure 11:
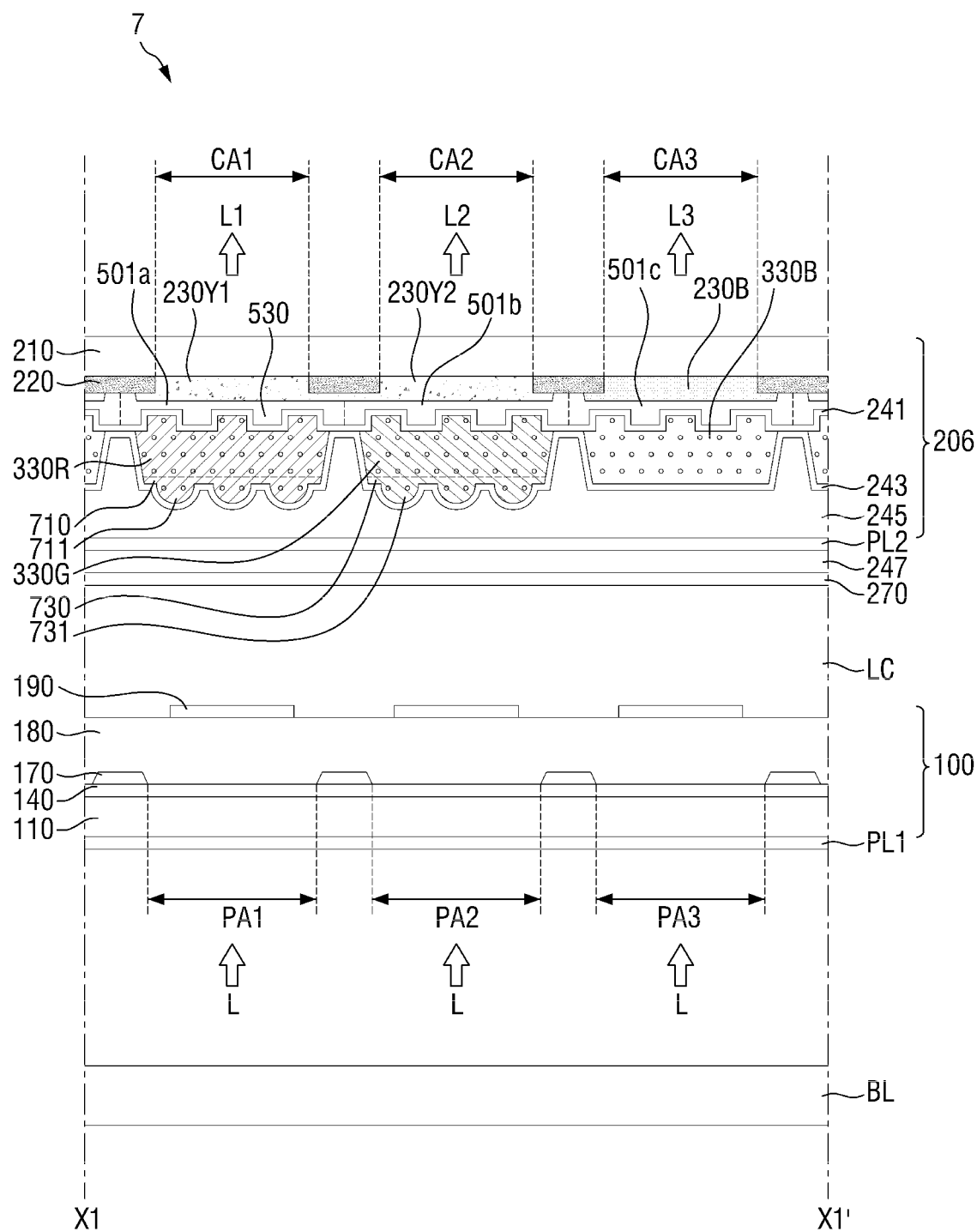
FIG. 11 is a cross-sectional view of a display device according to an embodiment.

FIG. 11 is a cross-sectional view of a display device according to an embodiment.

Referring to FIG. 11, a display device 7 is substantially identical to the display device 2 described above with reference to FIG. 6 except that a color conversion substrate 206 includes a third pattern layer 710 including a third optical pattern 711, and a fourth pattern layer 730 including a fourth optical pattern 731. The third pattern layer 710 and the fourth pattern layer 730 are substantially identical to or analogous to those described above with reference to FIG. 9.

Figure 12:
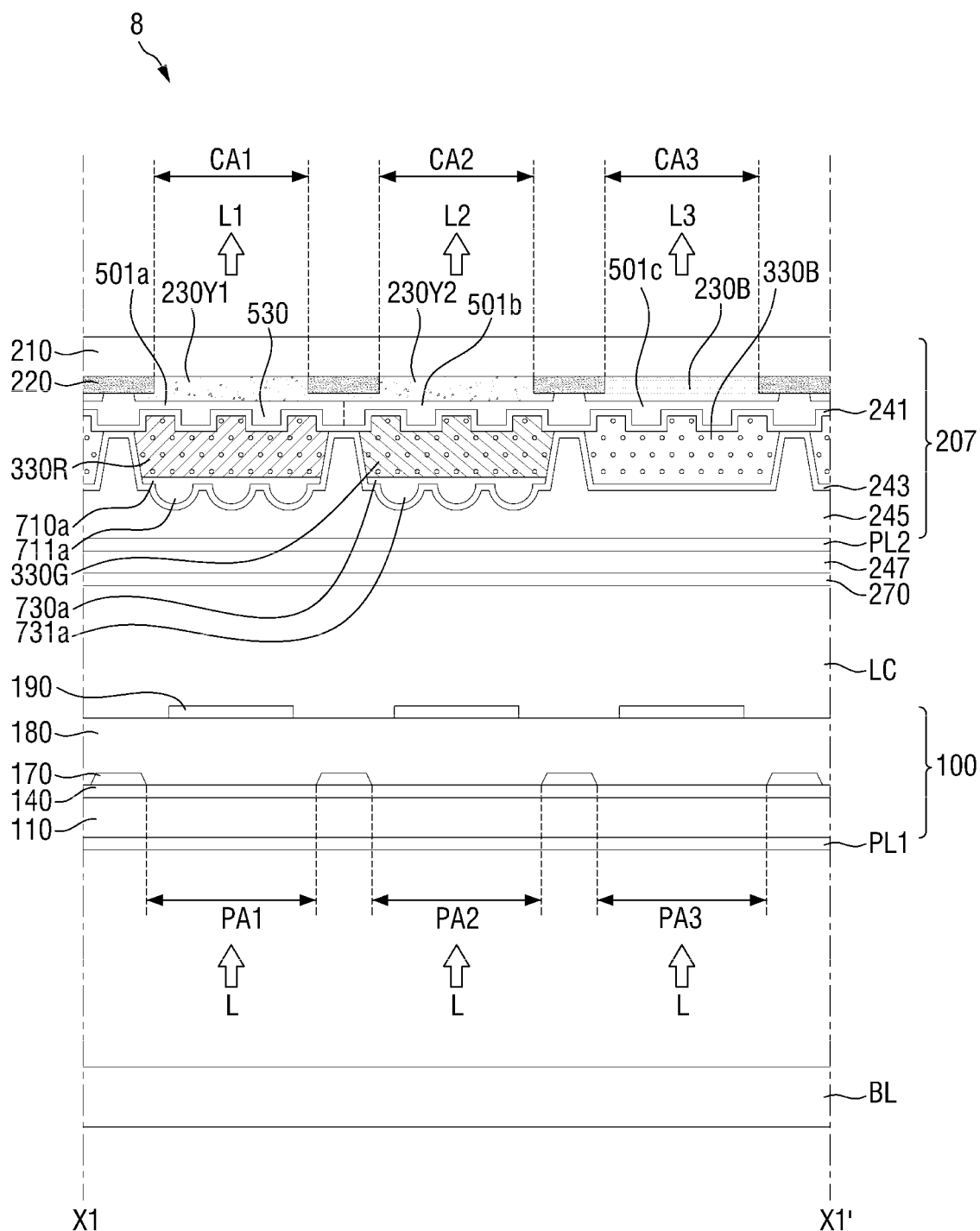
FIG. 12 is a cross-sectional view of a display device according to an embodiment.

FIG. 12 is a cross-sectional view of a display device according to an embodiment.

Referring to FIG. 12, a display device 8 is substantially identical to the display device 2 described above with reference to FIG. 6 except that a color conversion substrate 207 includes a third pattern layer 710a including a third optical pattern 711a, and a fourth pattern layer 730a including a fourth optical pattern 731a. The third pattern layer 710a and the fourth pattern layer 730a are substantially identical to or analogous to those described above with reference to FIG. 10.

Figure 13:
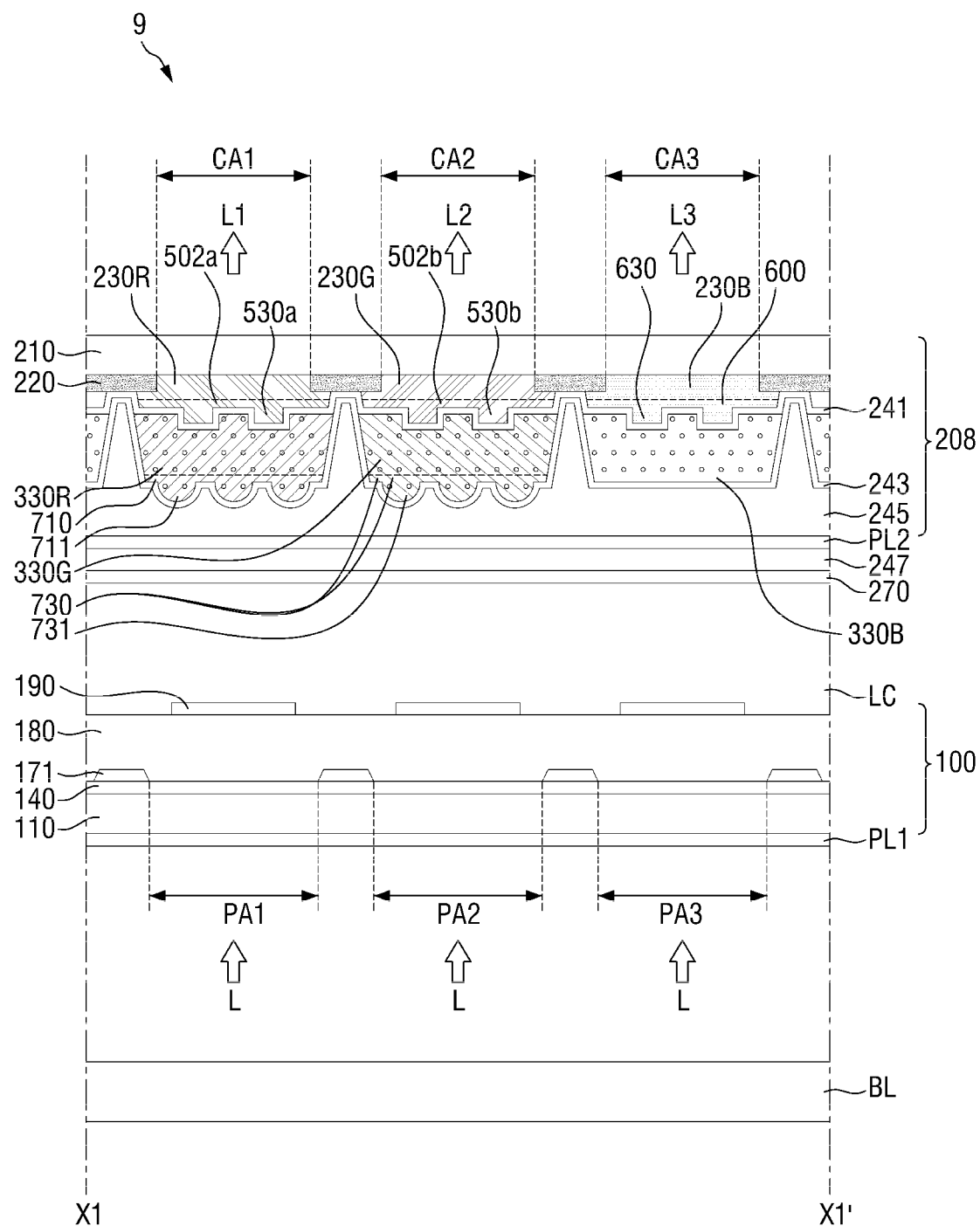
FIG. 13 is a cross-sectional view of a display device according to an embodiment.

FIG. 13 is a cross-sectional view of a display device according to an embodiment.

Referring to FIG. 13, a display device 9 is substantially identical to the display device 3 described above with reference to FIG. 7 except that a color conversion substrate 208 includes a third pattern layer 710 including a third optical pattern 711, and a fourth pattern layer 730 including a fourth optical pattern 731. The third pattern layer 710 and the fourth pattern layer 730 are substantially identical to or analogous to those described above with reference to FIG. 9.

Figure 14:
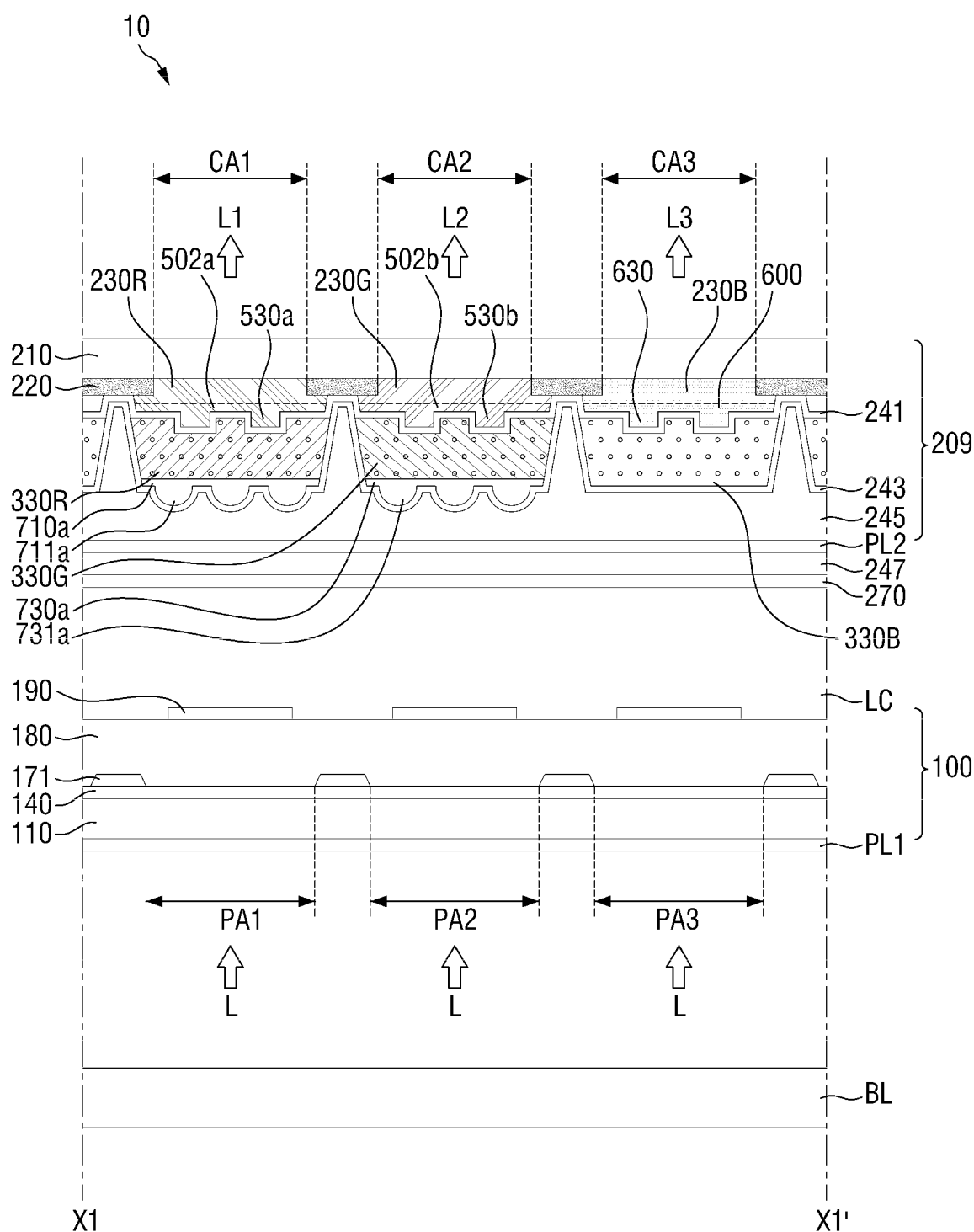
FIG. 14 is a cross-sectional view of a display device according to an embodiment.

FIG. 14 is a cross-sectional view of a display device according to an embodiment.

Referring to FIG. 14, a display device 10 is substantially identical to the display device 3 described above with reference to FIG. 7 except that a color conversion substrate 209 includes a third pattern layer 710a including a third optical pattern 711a, and a fourth pattern layer 730a including a fourth optical pattern 731a. The third pattern layer 710a and the fourth pattern layer 730a are substantially identical to or analogous to those described above with reference to FIG. 10.

Figure 15:
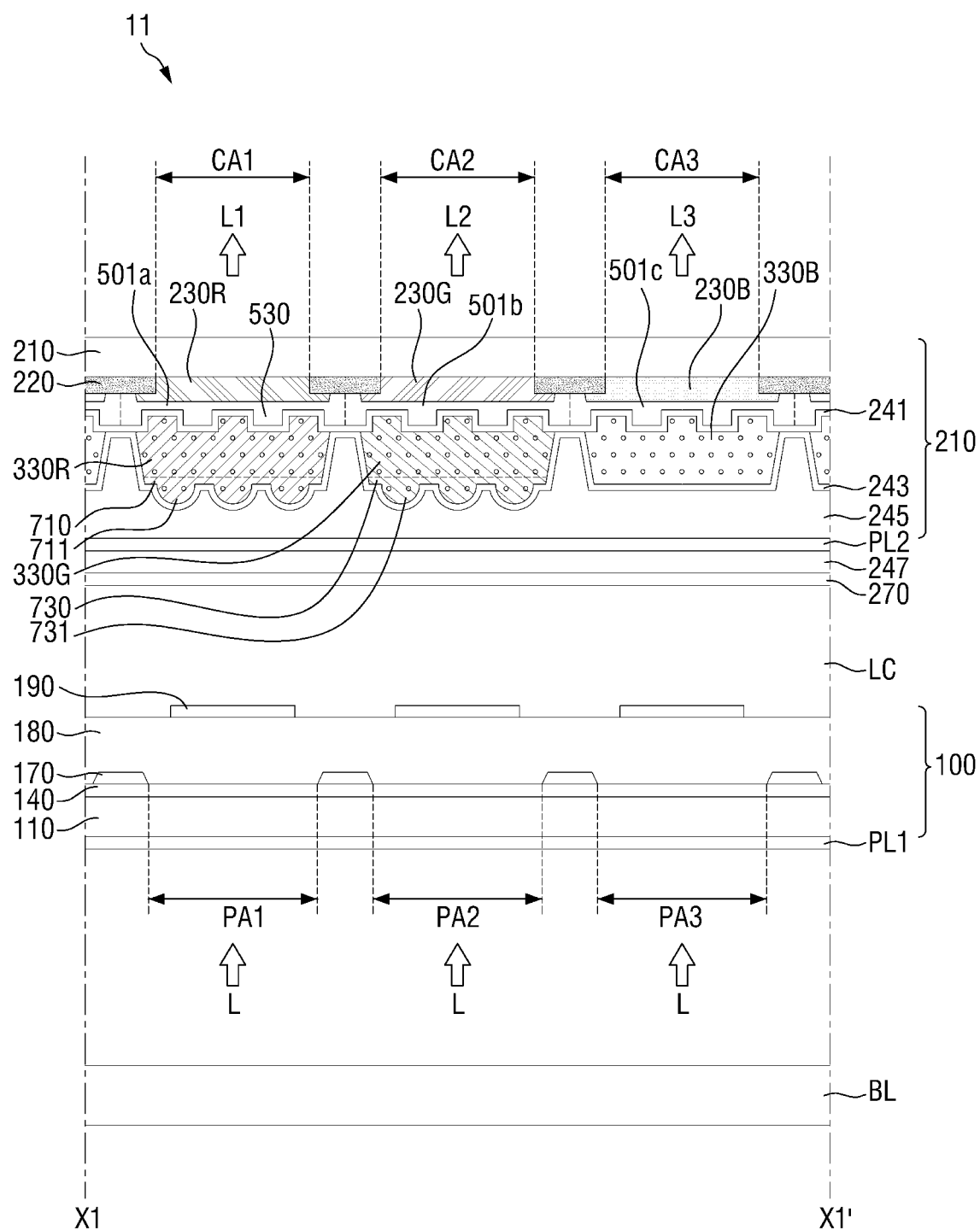
FIG. 15 is a cross-sectional view of a display device according to an embodiment.

FIG. 15 is a cross-sectional view of a display device according to an embodiment.

Referring to FIG. 15, a display device 11 is substantially identical to the display device 4 described above with reference to FIG. 8 except that a color conversion substrate 211 includes a third pattern layer 710 including a third optical pattern 711, and a fourth pattern layer 730 including a fourth optical pattern 731. The third pattern layer 710 and the fourth pattern layer 730 are substantially identical to or analogous to those described above with reference to FIG. 9.

Figure 16:
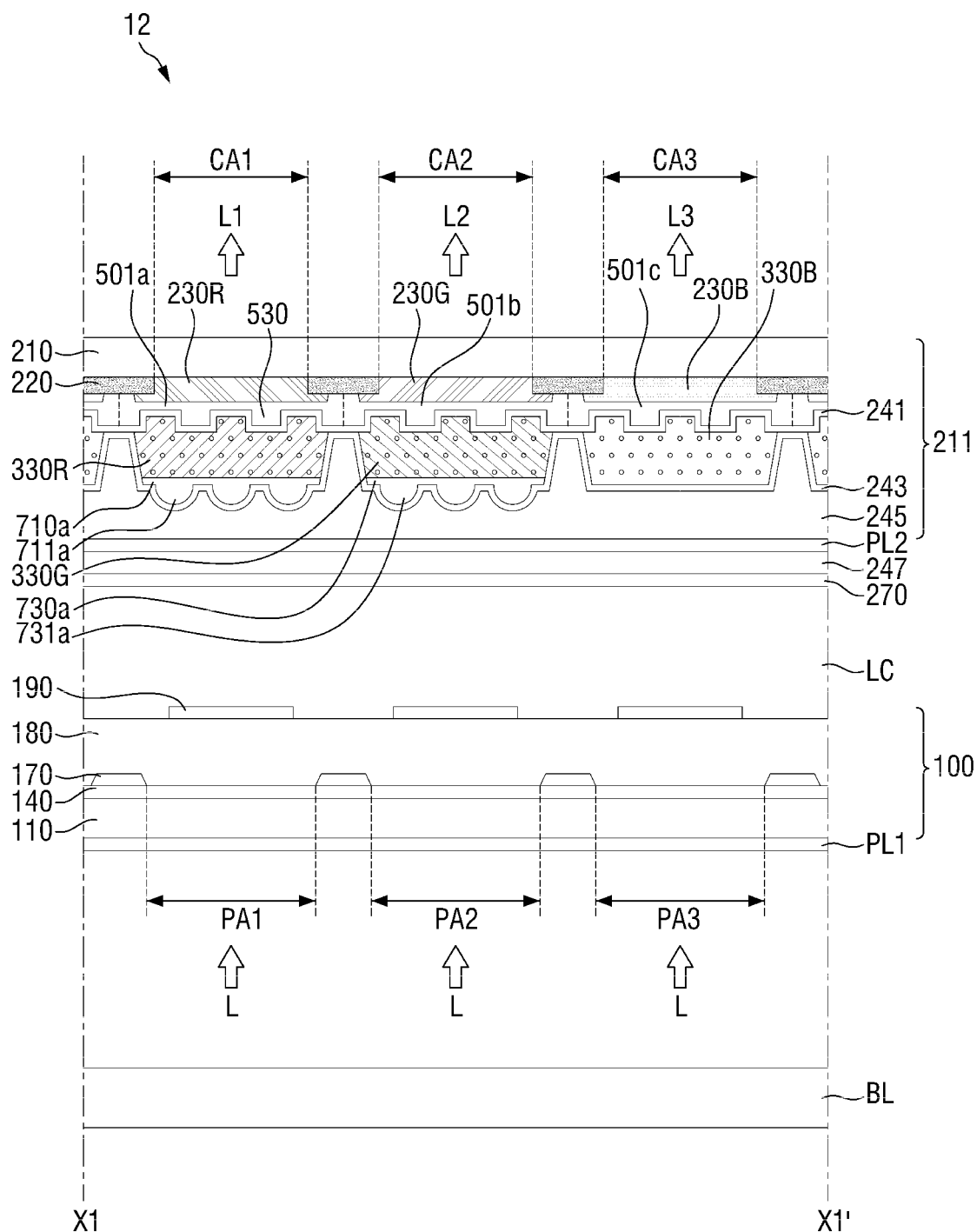
FIG. 16 is a cross-sectional view of a display device according to an embodiment.

FIG. 16 is a cross-sectional view of a display device according to an embodiment.

Referring to FIG. 16, a display device 12 is substantially identical to the display device 4 described above with reference to FIG. 8 except that a color conversion substrate 212 includes a third pattern layer 710a including a third optical pattern 711a, and a fourth pattern layer 730a including a fourth optical pattern 731a. The third pattern layer 710a and the fourth pattern layer 730a are substantially identical to or analogous those described above with reference to FIG. 10.

In a display device according to one or more embodiments, one or more optical patterns are disposed between a base substrate and one or more color conversion layers, so that satisfactory light output efficiency and satisfactory color gamut may be attained. One or more optical pattern layers having a light-condensing function may be disposed between a light source and one or more color conversion layers, thereby increasing light utilization and/or light conversion efficiency in the color conversion layers.

Although example embodiments have been disclosed for illustrative purposes, those skilled in the art will appreciate that various modifications, additions, and substitutions are possible, without departing from the scope and spirit defined in the accompanying claims.

What is claimed is:

1. A color conversion substrate for displaying a first color, a second color, and a third color, the color conversion substrate comprising:
  a base substrate;

a first light-blocking portion disposed on a surface of the base substrate and configured to block first light of the third color;
a second light-blocking portion disposed on the surface of the base substrate and configured to block second light of the third color;
a first pattern layer disposed on the first light-blocking portion and the second light-blocking portion and comprising a first optical pattern, wherein the first optical pattern comprises first-set protrusions;
a first color conversion layer overlapping the first light-blocking portion and configured to convert a first portion of incident light into light of the first color; and
a second color conversion layer overlapping the second light-blocking portion and configured to convert a second portion of the incident light into light of the second color,
wherein a first-set protrusion of the first-set protrusions protrudes into a recess of the first color conversion layer in a direction perpendicular to the surface of the base substrate, and wherein the recess of the first color conversion layer does not include any portion which does not overlap the first light-blocking portion in the direction perpendicular to the surface of the base substrate.

2. The color conversion substrate of claim 1, wherein the first light-blocking portion, the second light-blocking portion, and the first pattern layer are made of a same material, and
wherein the first-set protrusion of the first-set protrusions completely overlaps the first color conversion layer and the first light-blocking portion in the direction perpendicular to the surface of the base substrate.

3. The color conversion substrate of claim 1, wherein the first light-blocking portion is a first color filter configured to transmit the light of the first color, wherein the second light-blocking portion is a second color filter configured to transmit the light of the second color, wherein the first pattern layer comprises a first pattern portion and a second pattern portion, wherein the first pattern portion is made of a same material as the first color filter and overlaps the first color filter, and wherein the second pattern portion is made of a same material as the second color filter and overlaps the second color filter.

4. The color conversion substrate of claim 1, wherein the first pattern layer is made of a light-transmitting organic material, and
wherein the first-set protrusion of the first-set protrusions completely overlaps the first color conversion layer and the first light-blocking portion in the direction perpendicular to the surface of the base substrate.

5. The color conversion substrate of claim 1, wherein a width of the first-set protrusion of the first-set protrusions is greater than 0 μm and is equal to or less than 5 μm, wherein a height of the first-set protrusion is greater than 0 μm and is equal to or less than 1.5 μm, and wherein a distance between two immediately adjacent protrusions of the first-set protrusions is greater than 0 μm and is equal to or less than 10 μm.

6. The color conversion substrate of claim 1, further comprising:
a light-transmitting layer overlapping the base substrate, wherein the second color conversion layer is positioned between the first color conversion layer and the light-transmitting layer.

7. The color conversion substrate of claim 6, further comprising:
a color filter disposed between the light-transmitting layer and the surface of the base substrate and configured to transmit third light of the third color, wherein the first pattern layer overlaps the color filter.

8. The color conversion substrate of claim 6, further comprising:
a color filter disposed between the light-transmitting layer and the surface of the base substrate and configured to transmit third light of the third color; and
a second pattern layer disposed on the color filter and comprising a second optical pattern,
wherein the second optical pattern comprises second-set protrusions,
wherein the second pattern layer is made of a same material as the color filter, and
wherein a second-set protrusion of the second-set protrusions completely overlaps the light-transmitting layer and the color filter in the direction perpendicular to the surface of the base substrate.

9. The color conversion substrate of claim 1, further comprising:
a dichroic reflective layer disposed on the first color conversion layer and the second color conversion layer, configured to transmit the first light of the third color and the second light of the third color, and configured to reflect a portion of the light of the first color and a portion of the light of the second color.

10. The color conversion substrate of claim 1, further comprising:
a second pattern layer disposed on the first color conversion layer and comprising a second optical pattern, wherein the second optical pattern comprises second-set protrusions; and
a third pattern layer disposed on the second color conversion layer and comprising a third optical pattern, wherein the third optical pattern comprises third-set protrusions,
wherein a second-set protrusion of the second-set protrusions completely overlaps the first color conversion layer and the first light-blocking portion in the direction perpendicular to the surface of the base substrate, and
wherein a third-set protrusion of the third-set protrusions completely overlaps the second color conversion layer and the second light-blocking portion in the direction perpendicular to the surface of the base substrate.

11. The color conversion substrate of claim 10, wherein the second pattern layer is made of a same material as the first color conversion layer, and wherein the third pattern layer is made of a same material as the second color conversion layer.

12. The color conversion substrate of claim 10, wherein the second pattern layer and the third pattern layer are made of a light-transmitting organic material.

13. The color conversion substrate of claim 1, wherein the first color conversion layer and the second color conversion layer include quantum dots.

14. A display device comprising:
a display substrate;
a first pixel electrode, a second pixel electrode and a third pixel electrode disposed on the display substrate; and
a color conversion substrate overlapping the display substrate and configured to display a first color, a second color, and a third color,
wherein the color conversion substrate comprises:
a base substrate;

a first light-blocking portion disposed on a surface of the base substrate facing the display substrate, overlapping the first pixel electrode, and configured to block first light of the third color;
a second light-blocking portion disposed on the surface of the base substrate, overlapping the second pixel electrode, and configured to block second light of the third color;
a pattern layer disposed on the first light-blocking portion and the second light-blocking portion and comprising a first optical pattern, wherein the first optical pattern comprises first-set protrusions protruding toward the display substrate;
a first color conversion layer overlapping the first light-blocking portion and configured to convert a first portion of incident light into light of the first color; and
a second color conversion layer overlapping the second light-blocking portion and configured to convert a second portion of the incident light into light of the second color,
wherein a first-set protrusion of the first-set protrusions protrudes into a recess of the first color conversion layer in a direction perpendicular to the surface of the base substrate, and wherein the recess of the first color conversion layer does not include any portion which does not overlap the first light-blocking portion in the direction perpendicular to the surface of the base substrate.

15. The display device of claim 14, wherein the color conversion substrate further comprises:
a light-transmitting layer overlapping the third pixel electrode, wherein the second color conversion layer is positioned between the first color conversion layer and the light-transmitting layer; and
a third color filter disposed between the surface of the base substrate and the light-transmitting layer and configured to transmit third light of the third color.

16. The display device of claim 14, further comprising:
a liquid-crystal layer disposed between the display substrate and the color conversion substrate; and
a backlight unit configured to emit the first light of the third color, the second light of the third color, and the third light of the third color, wherein the display substrate is positioned between the liquid-crystal layer and the backlight unit.

17. The display device of claim 16, further comprising:
a common electrode disposed between the color conversion substrate and the liquid-crystal layer; and
a polarizing layer disposed between the common electrode and the color conversion substrate.

* * * * *